Sept. 9, 1952  R. H. STAEHLIN ET AL  2,609,738
CAMERA HOLDER
Filed March 29, 1950
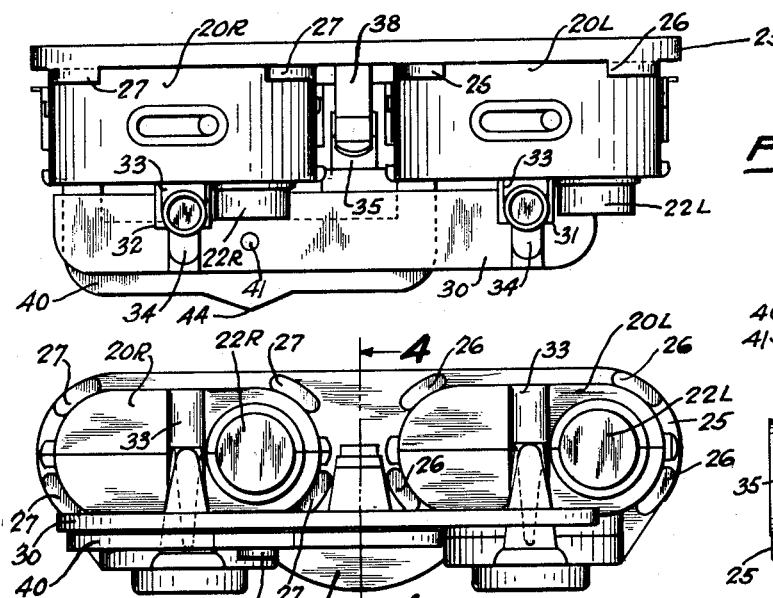
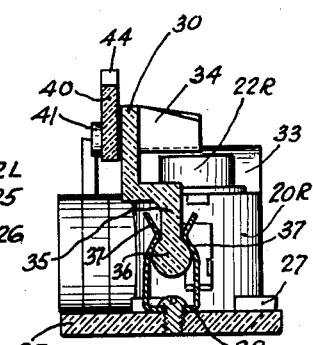
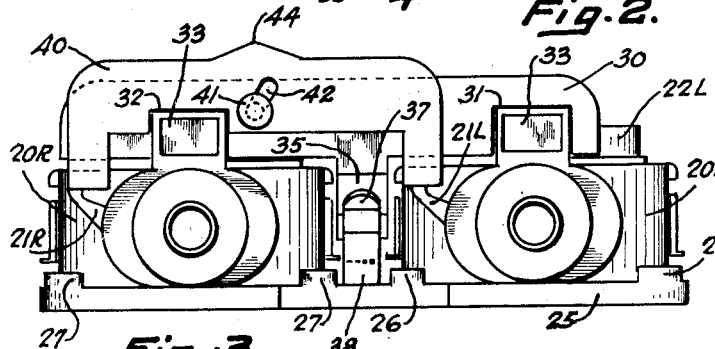
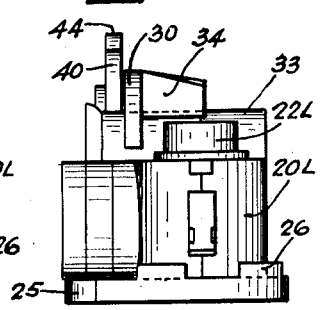
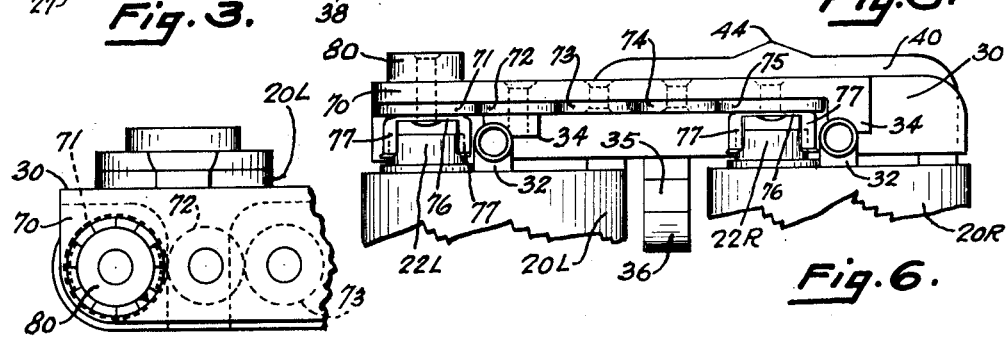
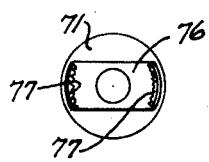
INVENTORS
RALPH H. STAEHLIN AND
MARY C. WUEBBEN
BY
THEIR ATTORNEY Patented Sept. 9, 1952

2,609,738

UNITED STATES PATENT OFFICE 2,609,738

CAMERA HOLDER

Ralph H. Staehlin and Mary C. Wuebben, Dayton, Ohio

Application March 29, 1950, Serial No. 152,602

7 Claims. (Cl. 95—18)

This invention relates to an improved support for cameras.

It is among the objects of the present invention to provide a support upon which a pair of identical cameras may be placed and rigidly held in predetermined relative positions, whereby two corresponding exposures of the same subject matter may simultaneously be taken for stereoscopic use.

A further object of the present invention is to provide a support upon which a pair of identical cameras are removably and rigidly secured in predetermined relative positions, said support having provisions for simultaneously actuating the shutter mechanism of the respective cameras.

A still further object of the present invention is to provide a support for twin cameras as defined in the preceding paragraph, said support also having provisions for actuating the film supply carrier or spool of both cameras simultaneously by the operation of a single element on said support.

Further objects and advantages of the present invention will be apparent from the following description, reference being had to the accompanying drawings wherein a preferred embodiment of the present invention is clearly shown.

In the drawings:

Fig. 1 is a rear elevational view of the carrier with the two identical cameras mounted thereon.

Fig. 2 is a top plan view of the device shown in Fig. 1.

Fig. 3 is a front elevational view of the device shown in Figs. 1 and 2.

Fig. 4 is a transverse sectional view taken substantially along the line and arrows 4—4 of Fig. 2.

Fig. 5 is an end view of the device illustrated in Fig. 3.

Fig. 6 is a fragmentary rear view illustrating a modified form of one element of the present invention.

Fig. 7 is a fragmentary plan view of the mechanism shown in Fig. 7.

Fig. 8 is a detail view of an element of the modified construction.

The device of the present invention was conceived and designed to hold two identical cameras in proper relative positions so that they may be operated simultaneously to produce two pictures of the same object, said pictures when properly mounted and viewed in a stereoscope producing the effect of solidity or relief by combining the images of the two pictures taken from points of view a little way apart due to the relative location of the two cameras on said device.

The drawings illustrating the invention show two identical cameras in the low cost field, purchasable on the open market and utilizing the popular and generally available 16 millimeter movie film either in black and white or in color. The cameras designated by the references 20R and 20L each have a shutter operating lever 21R and 21L respectively and an actuator 22R and 22L for the film supply carrier or spool within each camera.

For low cost production, lightness in weight and for strength, the parts of the present device are preferably made of some suitable molded plastic. The device consists of a base 25 having two sets of relatively arranged lugs 26 and 27 extending from one side thereof, the arrangement of each set being such that a camera may be placed in the space defined by each set, the lugs properly locating each camera and holding them against movement on said base.

A beam 30 has two recesses 31 and 32 which fit over and upon the respective housing portions 33 for the view finders of the respective cameras 20L and 20R. Any suitable means for detachably securing the beam of the base will, when said beam is placed upon both cameras, rigidly clamp and hold the cameras in proper position on said base. The present drawings show this means as comprising a depending integral lug 35 on said beam 30, the lug having an enlarged head portion 36 which, as shown in Fig. 4, is removably grasped by the oppositely disposed, resilient arms 37 of the clasp 38 secured to the base 25. In order to hold the cameras against tilting upon the base 25, beam 30 has angular lugs 34 which fit and press upon the respective view finder housings 33 of the respective cameras 20L and 20R.

A shutter actuating lever 40 is movably attached to the beam. A headed pin 41 extends through a slot 42 in lever 40 and is anchored in the beam 30. Extensions at the ends of lever 40 engage the shutter levers 21L and 21R of the cameras when said beam 30 is secured to the base to hold the cameras thereon. The longitudinal center line of elongated slot 42 in lever 40 is substantially parallel to the line of movement of said shutter levers and thus when lever 40 is pressed upon at its central high point 44, it will move bodily, substantially parallel with the movement of the levers 21L and 21R, thereby actuated simultaneously by said lever 40. However, when pressure is exerted at either end of lever 40, said lever will tilt about its supporting pin 41 and thus the camera shutter, whose lever 21L or 21R is engaged by the pressed end will individually be actuated.

For greater convenience and accuracy and to eliminate the necessity of individually operating the actuators for the film supply spools of the separate cameras, the present device is equipped with mechanism which mechanically ties said actuators together so that they may be operated simultaneously. This mechanism comprises a train of rotary motion transmitting elements such as gears, friction wheels and the like, rotatably carried by an angular shelf 70 formed on the clamping beam 30. The train of rotatable elements are designated respectively by the numerals 71, 72, 73, 74 and 75, see Figs. 6 and 7. Elements 71 and 75, rotatably carried by beam shelf 70, each have a member 76 attached thereto to rotate therewith, each member 76 having diametrically opposite resilient finger portions 77, arcuated to fit over and securely grasp the respective film spool actuators 22L and 22R when the beam is placed upon the cameras 20L and 20R. On the side of the shelf 70, opposite the elements 71 to 75, a single actuator 80 is provided, said actuator 80 being mechanically connected to element 71. The shelf 70 has a graduated, circular scale thereon, surrounding the actuator 80, said scale being a duplicate of the scale provided on the cameras about their respective film spool actuators 22L and 22R. Thus when the single actuator 80, in convenient availability on top of the beam shelf 70, is rotated through one portion of the indicated scale on the shelf 70, the train of elements 71 to 75 are concurrently rotated whereby the elements 71 and 75 with their respective fingered members 76 will rotate the film spool actuators of both cameras through a corresponding portion of a revolution to shift both film supplies and thereby provide a proper unexposed section of the film in each camera for the next exposure.

The parts of the present device are easily put together for holding two cameras in proper relative positions to take dual pictures of an object simultaneously and are just as easily disassembled to remove the cameras. The device assures simultaneous operation of the shutter mechanism as well as the film supply spools of both cameras thus assuring accuracy in exposure and film frame provision for both pictures in each exposure.

While the embodiment of the present invention as herein disclosed, constitutes a preferred form, it is to be understood that other forms might be adopted.

What is claimed is as follows:

1. In a device of the character described, the combination with a base upon which two identical cameras are placed and held in predetermined relative positions; of a beam contoured to fit over the top of both cameras and engage them; cooperating interlocking ball and spring socket means on the beam and base respectively, said means being operative, removably to secure the beam to base for clamping the cameras in position on said base; and a lever movably attached to the beam by means of a pin on the beam extending through an elongated slot in the lever, the lever having portions engaging similar operating elements on said cameras, said lever being operative in parallelism with the beam or tiltably either to actuate the operating elements of both cameras respectively simultaneously or individually as desired.

2. In a device of the character described, the combination of a base having means providing spaces in which identical cameras may be nested to position them in predetermined relative positions; of a beam shaped to fit upon the surface of both cameras opposite the side of the cameras engaging the base; a resilient receptacle on the base; a detent on the beam engageable with the resilient receptacle when said beam is placed on both cameras for securing the cameras on said base; and a lever secured to the beam by a pin on the beam extending through a slot in the lever so as to be movable thereon either in parallelism thereto or tiltably thereon, said lever engaging operating elements on both cameras and being operative to actuate them, either in unison or individually.

3. In a device of the character described, the combination with a base; lugs on the base forming spaces for receiving and holding identical cameras in predetermined relative positions, each camera having a shutter lever; a beam shaped to fit over and engage identical portions of each camera; cooperating ball and socket means on the beam and base operative removably to secure the beam to the base for clamping the cameras to said base; and a lever having end portions engaging the shutter lever of each camera and intermediately secured to the beam by means of a pin on the beam extending through an inclined slot in the lever so as to be movable either in parallelism to the beam simultaneously to actuate the said shutter levers, or tiltably to the beam to actuate either shutter lever individually.

4. In a device of the character described, the combination with a base upon which two identical cameras may be placed; means on the base for holding said cameras in predetermined relative positions, each camera having a shutter operating lever; a beam engaging both cameras; means operative detachably to secure the beam to the base for securely clamping the cameras to said base; a lever engaging both camera shutter levers said lever having an elongated slot whose longitudinal center is substantially parallel with the path of movement of said shutter levers; and a pin on the beam, extending through said slot in the lever for securing the lever to the beam and permitting said lever to be moved either pivotally on the beam or substantially in parallelism thereto and in a line corresponding to the line of shutter lever movements.

5. In a device of the character described the combination with a base adapted to have two identical cameras placed in predetermined relative positions thereon; of a beam, notched to fit about and engage identical portions of each camera, said cameras each having a shutter operating member; a lug on the beam, said lug having an enlarged head portion; a retainer on the base, said retainer having spaced, oppositely disposed resilient arms for receiving the head portion of the lug whereby the beam is removably secured to the base and the cameras securely clamped thereon by said beam; and a lever movably secured to the beam by means of a pin on the beam extending through a slot in the lever, said lever engaging the shutter operating members of both cameras and being operative to actuate said members either individually or in unison when said beam is secured to the base.

6. In a device of the character described the combination with a base adapted to have two identical cameras placed thereon in predetermined relative positions, said cameras each having shutter and film carrier actuators; of a beam fitting over and upon identical portions of said cameras; means on the beam and base, cooperating removably to secure the beam to the base for clamping the cameras thereupon; a lever movably carried by the beam by means of a pin extending through an inclined slot in the lever and engaging the shutter actuators of both cameras said lever being operative for operating said actuators either simultaneously or individually; a train of connected rotary movement transmitting elements on the beam, two of which operatively engage the fil mcarrier actuators of the respective cameras for turning them simultaneously in the same direction; and an actuator on the beam, operatively connected to one of said two elements for actuating the train of elements and thus the film carriers of both cameras simultaneously.

7. In a device of the character described the combination with a base adapted to have two identical cameras placed thereon in predetermined relative positions, said cameras each having shutter and film carrier actuators; of a beam fitting over and upon identical portions of said cameras; ball and socket means on the beam and base, cooperating removably to secure the beam to the base for clamping the cameras thereupon; a lever movably carried by the beam by means of a pin on the beam extending through a slot in the lever, the lever engaging the shutter actuators of both cameras, said lever being operative for operating said actuators either simultaneously or individually; two rotatable elements carried by the beam, each directly over a film carrier actuator of a respective camera when said beam is in position to hold the cameras on the base; resilient fingers on each of said elements operative to fit over the adjacent film carrier actuators and operatively connect them to the respective elements; rotary movement transmitting means on the beam and operatively connected to both said elements for rotating them in the same direction concurrently; and an actuator on the beam operatively connected to one of said elements for turning it.

RALPH H. STAEHLIN.
MARY C. WUEBBEN.

REFERENCES CITED

The following references are of record in the file of this patent:

UNITED STATES PATENTS

| Number | Name | Date |
|---|---|---|
| 1,542,730 | Richards | June 16, 1925 |
| 2,453,075 | Land | Nov. 2, 1948 |
| 2,453,180 | Bachelder | Nov. 9, 1948 |
| 2,458,466 | Campbell | Jan. 4, 1949 |